Feb. 28, 1956    J. L. PERKINS    2,736,125
FISH LURE
Filed March 31, 1953

INVENTOR.
John L. Perkins
BY
Robt. W. Pearson
ATTORNEY.

2,736,125

FISH LURE

John L. Perkins, Los Angeles, Calif.

Application March 31, 1953, Serial No. 345,943

1 Claim. (Cl. 43—42.34)

This invention relates to a fish lure and more particularly to a fish lure which advantageously combines light reflection and an oscillatory or serpentine movement (like that of a swimming fish), when the lure is trolled in the water, thus efficiently attracting the fishes.

An object of the invention is to provide a fish lure which will more efficiently direct reflected light in all directions, so as to attract a larger number of the fish being sought.

Another object is to provide a better means for causing the lure to oscillate or undergo a fish-like movement when trolled in the water.

Other objects, advantages and features of invention will hereinafter appear.

Referring to the accompanying drawing, which illustrates preferred embodiments of the invention, which have been reduced to practice, Fig. 1 is a side elevation of the lure, an attached fishhook and a fragment of the line being shown in dotted lines.

Figure 1:
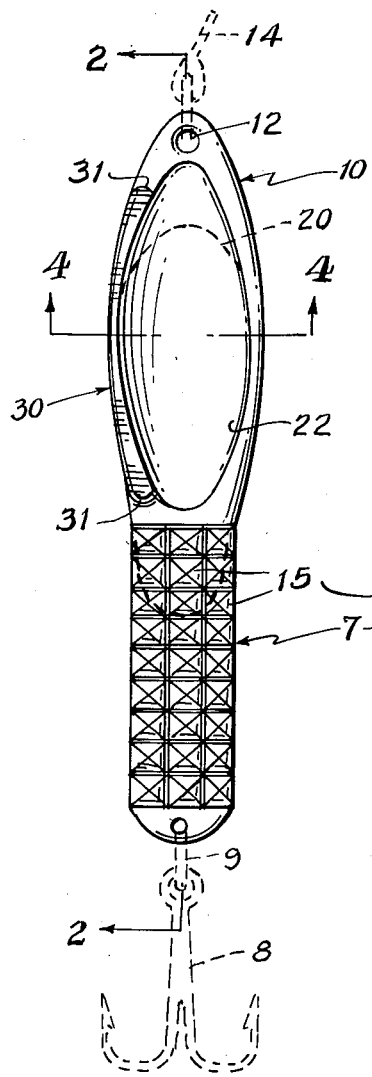

Referring more particularly to the first four views, the elongated light reflecting lure shown is adapted to attract both large and small fish. It comprises a light reflecting section 7 which extends from its midlength portion to one of its ends and which has attached to it a multiple hook 8 by means of a flexible connection 9; and a movement guiding or spoon section 10 extending throughout the remainder of its length, having in its outer end portion an eye 12 to which is attached the line 14.

The invention resides in part in the provision of improved assemblies of light reflecting projections 15 which are shaped as quadrilateral pyramids and which are arranged in rows which extend both longitudinally and transversely of the lure. The lure is made of, or coated with, some metal having a bright, light reflecting surface and each side of said pyramidal projections will provide a light reflecting facet.

Figures 2, 3, 5:
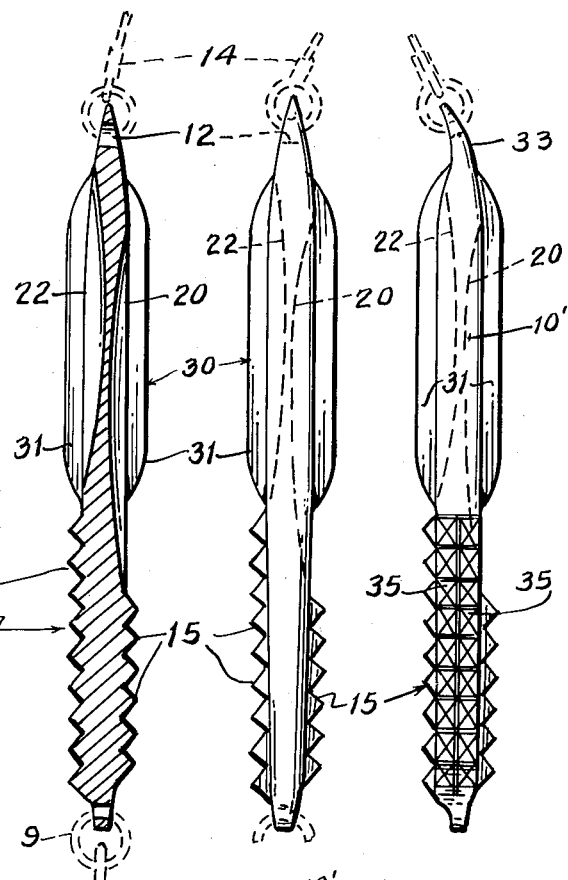
Fig. 2 is a longitudinal section on line 2—2 of Fig. 1.
Fig. 3 is an elevation viewing the lure at a right angle to the showing thereof in Fig. 1.
Fig. 5 is an elevation of a modification, showing the attached end of the lure deflected.

As is clearly shown in Figs. 2 and 3, an assembly of the light reflecting projections 15 is carried by each side of the flattened portion 7 of the lure, in the assembly of projections, the assembly on the right not extending as far as the midlength of the lure, thus leaving more room for a spoon like concavity 20 which extends across the midlength part of the lure and which terminates a considerable distance from that end of the lure which is attached to the line 14. Each of these spoon like concavities has end portions which blend in a streamline manner with the surface of the body of the lure. The lure body is sufficiently thick to afford enough stock for the formation of said concavities, which are formed as recesses therein. Said spoon surface 20 is positioned considerably rearward of a somewhat shorter spoon surface 22 in the opposite side of the lure, said surface 22 extending nearly to the part of the lure to which the line 14 is attached. Owing to one spoon surface being thus placed ahead of the other a serpentine movement is given to the lure when pulled through the water by a fisherman. It will be seen that, although one of said spoon surfaces is disposed ahead of the other, yet said surfaces overlap the greater part of their lengths.

Figure 4:
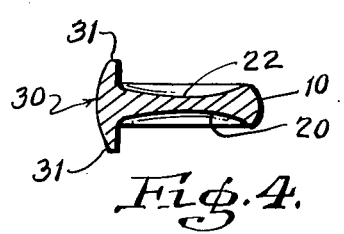
Fig. 4 is a cross section on line 4—4 of Fig. 1.

As most clearly shown in Fig. 4, a keel 30 is provided along one edge of the lure, said keel extending a considerable distance alongside the spooned part of the lure to maintain the lure in a keel down position while being drawn through the water. Said keel consists of a pair of opposite disposed, slightly arcuate ribs or ridges 31.

It will be observed that the spooned part of the lure, along one edge portion of which said keel extends, is convex along each side edge. Or this part of the lure, viewed in side elevation, may be said to be shaped as an elongated ellipse which is truncated at its inner end but is bluntly pointed at the end to which the line 14 is attached.

In Fig. 5 is shown a modification wherein the apertured line attached end of the lure is provided with a laterally deflected extension or fin 33 which accentuates the serpentine movement imparted to the lure when drawn through the water. This fin is shown deflected toward that side of the lure which carries the spoonlike concavity 22.

Figure 6:
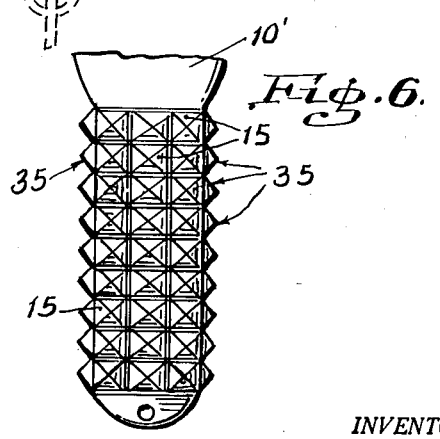
Fig. 6 is a fragmentary side elevation, showing a modification on an enlarged scale, of the light reflecting means.

Also, in this modification, as shown in Figs. 5 and 6 the fishhook carrying end portion of the lure, though flattened, is of a generally rectangular cross section throughout a considerable portion of the length of the lure, and each of the four faces of this part carries an assembly of pyramidal light reflecting faces, so that an assembly 35 of the projections is carried by each of the narrower faces or surfaces of said rectangular cross section.

In both the illustrated embodiments of the invention that end portion (about half the length of the lure), which has in it the spoon like concavities is considerably broader (being convex at each side), than the facet carrying half of the lure. Owing to this fact said concavities act more efficiently in producing the aforesaid serpentine movement of the lure and such movement causes the aforesaid facets to reflect the light in a more noticeable manner.

I claim:

A fishing lure having greater length than width and comprised of a rear portion and a front portion, the rear portion having opposite faces thereof serrated, the serrations on one face extending for a greater part of the length of the rear portion than the serrations on the opposite face, the front portion having a maximum width greater than the width of the rear portion and provided with concavities on opposite faces thereof, the concavity on one face being of greater length than the concavity of the opposite face, the concavity of greater length having a part thereof disposed opposite the serrations of greater length and the front and rear portions having openings therein for the connection of a fishing line and a hook respectively.

(References on following page)

References Cited in the file of this patent

UNITED STATES PATENTS

| | | |
|---|---|---|
| 1,193,077 | Schoonmaker | Aug. 1, 1916 |
| 1,300,149 | Evans | Apr. 8, 1919 |
| 1,422,457 | McClanahan | July 11, 1922 |
| 1,463,858 | Wandve | Aug. 7, 1923 |
| 1,525,291 | Green | Feb. 3, 1925 |
| 1,885,440 | Hendrick | Nov. 1, 1932 |
| 2,241,941 | Bates | May 13, 1941 |
| 2,480,580 | Hopkins | Aug. 30, 1949 |
| 2,583,616 | Waddell | Jan. 29, 1952 |
| 2,594,673 | Nichols | Apr. 29, 1952 |

FOREIGN PATENTS

| | | |
|---|---|---|
| 110,625 | Sweden | 1944 |